Oct. 20, 1970 — L. A. ROWE — 3,534,919

SPINNING REEL

Filed Jan. 9, 1969

INVENTOR
Lacy A. Rowe

BY Munson H. Lane

ATTORNEY

United States Patent Office 3,534,919
Patented Oct. 20, 1970

3,534,919
SPINNING REEL
Lacy A. Rowe, 1851 Skycoe Drive, Salem, Va. 24153
Filed Jan. 9, 1969, Ser. No. 790,112
Int. Cl. A01k 89/00
U.S. Cl. 242—84.2                        8 Claims

ABSTRACT OF THE DISCLOSURE

A spinning reel for fishing lines, having a housing with a rotatable cover from the periphery of which the line extends generally in the direction of axis of rotation. An external yoke, having a guiding eye through which the line passes, is pivoted to the housing for swinging movement so that the line guiding eye may be concentric or eccentric with respect to the axis of rotation of the cover. Means are provided for releasably locking the yoke in an adjusted position.

---

This invention relates to new and useful improvements in spinning reels for fishing lines, and in particular the invention concerns itself with a spinning reel of the type having a dome-shaped rotatable spool cover from the periphery of which the line is paid out or reeled in in a direction of the axis of rotation of the cover.

The principal object of the invention is to provide such a reel with means whereby the line may be reeled in at an alternately fast and slow rate while the reel spool cover is rotated at substantially constant speed, whereby a considerable amount of jerking or tugging is imparted to the line for attracting the attention of fish.

The present invention represents certain structural and functional improvements in spinning reels disclosed in my earlier Pat. No. 3,166,267, dated Jan. 19, 1965, and an important feature of the present invention is that it may be applied to conventional spinning reels without requiring any modification of the reels itself.

With the foregoing more important object and features in view and such other objects and features as may become apparent as this specification proceeds, the invention will be understood from the following description taken in conjunction with the accompanying drawings, wherein like characters of reference are used to designate like parts, and wherein.

Figure 1:
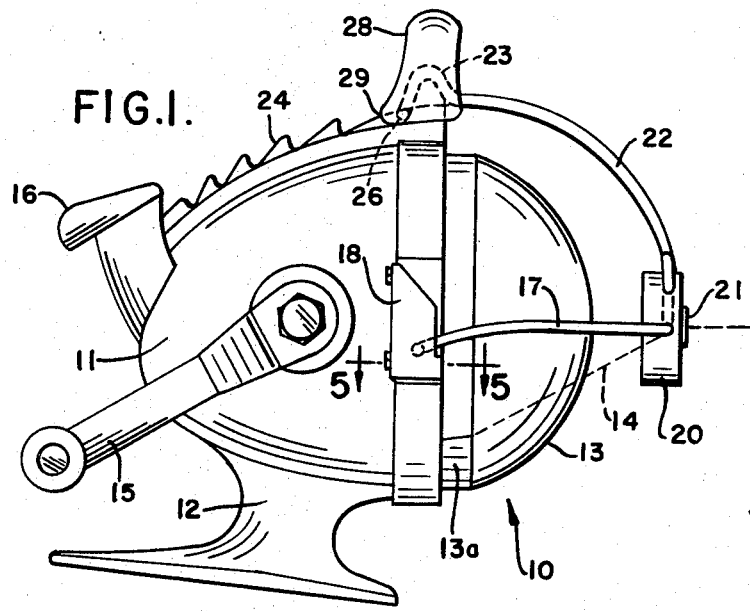
FIG. 1 is a side elevational view of a spinning reel embodying the invention, the line guiding means being shown in the concentric position.

Referring now to the accompanying drawings in detail, the general reference numeral 10 designates a typical spinning reel of a conventional construction which need not be described in detail or illustrated in terms of its internal arrangement, since this is well known in the art. However, it may be noted that the reel includes a housing 11 with a mounting base portion 12, and a rotatable spool cover 13 from the periphery 13a of which a line indicated at 14 may be paid out or reeled in, generally in the direction of the axis of rotation of the cover. The cover is substantially dome-shaped and is rotated by a hand crank 15. A push button 16 is provided on the housing for shifting the cover 13 axially in the usual manner.

The invention resides in the provision of guiding means for the line 14 at the outside of the spool cover 13, arranged so that when the line guiding means are concentric with the axis of rotation of the cover, the line may be reeled in or paid out at a constant rate of speed. However, when the guiding means are disposed eccentrically from the axis of cover rotation, the point at which the line engages the periphery of the cover moves alternately toward and away from the guiding means, with the result that the line may be reeled in at an alternately fast and slow rate while the speed of rotation of the cover is substantially constant, and distinct jerking or tugging is imparted to the line for attracting the attention of fish.

Figure 5:
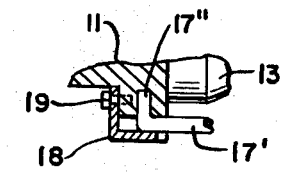
FIG. 5 is a fragmentary sectional detail, taken substantially in the plane of the line 5—5 in FIG. 1.

The line guiding means comprise a yoke 17 which is disposed externally of the cover 13 and straddles the cover with its side members 17' being pivotally connected to opposite sides of the housing 11 so that the yoke is swingable about an axis transverse to the axis of rotation of the cover 13. The yoke side members 17' may be formed from wire rod and, conveniently, may have inturned ends 17" inserted in suitable apertures formed in the housing 11, whereby to pivotally connect the yoke to the housing, as shown in FIG. 5. In order to prevent the yoke ends 17" from sliding out of the apertures in the housing, an angle-shaped keepers 18 may be secured to the opposite sides of the housing by suitable screws 19, as will be apparent from FIG. 5.

Figure 3:
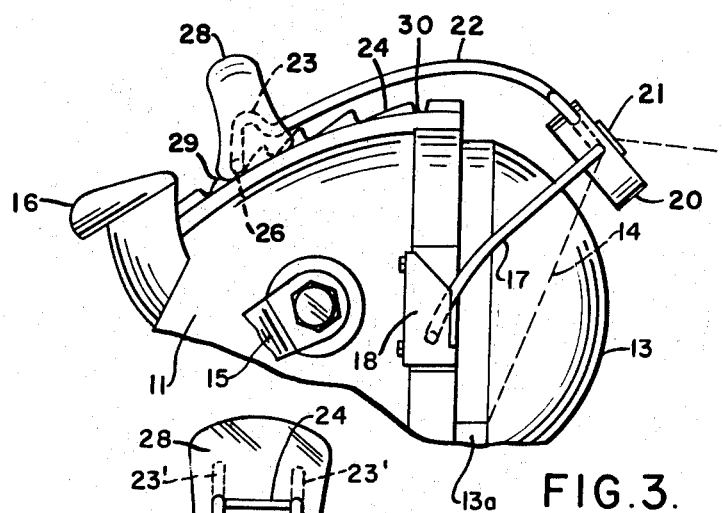
FIG. 3 is a fragmentary side elevational view, similar to that in FIG. 1 but showing the line guiding means in an eccentric position.

The yoke 17 also includes a central block 20 which is provided with a guiding eye 21 having the line 14 passing therethrough. It will be noted that by virtue of its pivotal connection to the housing 11, the yoke 17 may be swung from the position shown in FIG. 1 where the line guiding eye 21 is concentric with the axis of rotation of the cover 13, to another position exemplified in FIG. 3 where the line guiding eye is eccentric from the axis of rotation of the cover.

Figure 2:
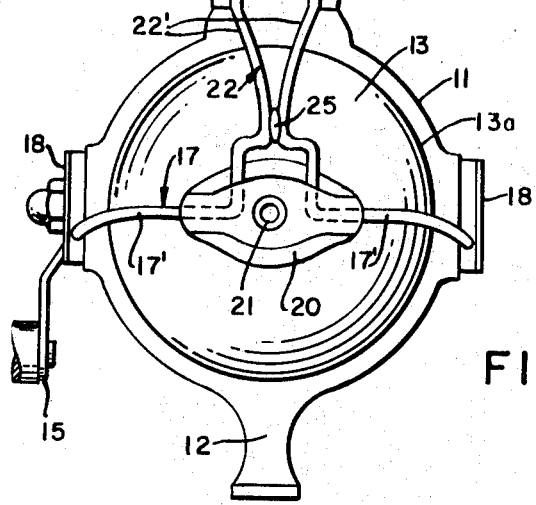
FIG. 2 is a front elevational view thereof.

Releasable means are provided for locking the yoke 17 in an adjusted position. Such means comprise an arm 22 which extends from the yoke block 20 and is curved so that its free end portion 23 is disposed above the housing 11 for cooperation with a toothed rack 24 which is provided on the housing in a direction parallel to the axis of rotation of the cover 13. Conveniently, the arm 22 may consist of a pair of wire rod members 22' which are continuations of the respective yoke side members 17' beyond the block 20, as will be clearly apparent from FIG. 2. The latter also shows that the arm members 22' are secured together at 25 as by soldering or welding, whereupon they become divergent so that their end portions 23' are transversely spaced but are connected together by a bight portion 26.

Figure 4:
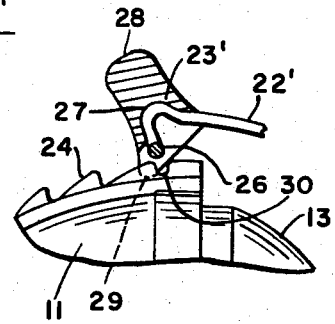
FIG. 4 is a fragmentary view, partly in section and partly in elevation, showing the action of the finger-piece.

The arm end portions 23' are angulated or curved so as to fit into a seat 27 provided in a finger-piece 28, while leaving the bight portion 26 exposed under the seat 27 as shown in FIG. 4, so that the bight portion 26 may operatively engage the toothed rack 24. It will be understood that the finger-piece 28 is held on the arm end portions 23' and that the arm members 22' are inherently resilient so that the bight portion 26 is urged into engagement with the toothed rack 24 and the finger-piece 28 is similarly urged against the housing 11. The underside of the finger-piece 28 is rececessed to accommodate the bight portion 26 and to provide clearance for the rack 24, but side portions of the finger-piece engage the housing 11 at opposite sides of the rack and are cam-shaped as at 29, for a purpose hereinafter described.

In the position shown in FIG. 1 wherein the line guiding eye 21 is concentric with the axis of rotation of the cover 13, the yoke 17 is locked in that position by engagement of the arm bight portion 26 with a notch 30 at the front end portion of the toothed rack 24. When it is desired to move the yoke 17 to an eccentric position of the eye 21, the finger-piece 28 is tilted rearwardly as shown in FIG. 4, while its cam-shaped portions 29 bear against the housing 11. This causes the arm bight portion 26 to be withdrawn upwardly from the notch 30 of the rack 24, and the finger-piece 28 may then be slid rearwardly along the rack 24 to an extent required for attaining a desired amount of eccentricity of the line guiding eye 21 with respect to the center of rotation of the cover 13, as for example shown in FIG. 3. During this procedure the resilient arm 22 may alter its curvature so as to bias its end portion 23 even more strongly toward the housing 11, and when tilting pressure on the finger-piece 28 is discontinued, the bight portion 26 will become seated against one of the teeth of the rack 24, thus locking the yoke 17 in an adjusted position.

The teeth of the rack 24 are so shaped and slanted as to lockingly retain the arm bight portion 26 in an adjusted position while the line 14 is being reeled in. However, if a fish is caught and the tension on the line 14 is sufficiently increased, the yoke 17 will automatically return to the concentric position of the line guiding eye 21 while the bight portion 26 skips forwardly over the teeth of the rack 24.

The finger piece 28 is held on the arched end portion 23 of the arm 22 by a transverse pin 28'.

What is claimed as new is:

1. In a spinning reel of the type having a housing with a dome-shaped rotatable spool cover from the periphery of which a line extends generally in the direction of the axis of rotation of said cover, an improvement whereby the line may be reeled in at varying speeds while the speed of rotation of the cover is substantially constant, said improvement comprising an external yoke straddling said cover and pivoted to said housing for swinging movement about an axis transverse to the axis of rotation of the cover, a line guiding eye provided at the center of said yoke and having said line passing therethrough, said yoke being swingable from one position wherein said eye is concentric with the axis of rotation of the cover to at least one other position wherein the eye is eccentrically offset from said axis of rotation, and means for releasably locking said yoke in an adjusted position.

2. The reel as defined in claim 1 which is further characterized in that said locking means are releasable automatically to permit swinging of said yoke from the eccentric to the concentric position of said eye as a function of a predetermined amount of tension on said line.

3. The reel as defined in claim 1 wherein said releasable locking means include an intermediate arm connected to said yoke and having a free end portion extending over said housing, and detent means provided on said housing, the free end portion of said arm being releasably engageable with said detent means.

4. The reel as defined in claim 3 wherein said detent means comprise a toothed rack provided on said housing and extending in a direction parallel to the axis of rotation of said cover, the free end portion of said arm being releasably engageable with the teeth of said rack.

5. The reel as defined in claim 4 which is further characterized in that said arm is resilient and by virtue of its resiliency the free end portion of the arm is urged into engagement with the teeth of said rack.

6. The reel as defined in claim 4 together with a finger-piece provided on the free end portion of said arm.

7. The reel as defined in claim 4 together with a finger-piece provided on the free end portion of said arm, said finger-piece including a cam portion operatively engageable with said housing to disengage the free end portion of the arm from the teeth of said rack when the finger-piece is actuated for swinging said yoke to an eccentric position of said eye.

8. The reel as defined in claim 4 wherein said yoke includes a central block provided with said guiding eye, and a pair of side members extending from said block in straddling relation to said cover with ends of said side members being pivoted to opposite sides of said housing, said intermediate arm being connected to said block of the yoke.

References Cited

UNITED STATES PATENTS

| | | |
|---|---|---|
| 2,590,369 | 3/1962 | Beeler. |
| 3,166,267 | 1/1965 | Rowe _____ 242—84.2 |
| 3,298,630 | 1/1967 | Taggart _____ 242—84.21 |

BILLY S. TAYLOR, Primary Examiner